United States Patent [19]

Lee et al.

[11] Patent Number: 4,984,865
[45] Date of Patent: Jan. 15, 1991

[54] THERMOPLASTIC ADHESIVE MOUNTING APPARATUS AND METHOD FOR AN OPTICAL FIBER CONNECTOR

[75] Inventors: Nicholas A. Lee, Woodbury; James E. Toonen, Burnsville, both of Minn.

[73] Assignee: Minnesota Mining and Manufacturing Company, St. Paul, Minn.

[21] Appl. No.: 439,095

[22] Filed: Nov. 17, 1989

[51] Int. Cl.$^5$ ............................ G02B 6/26; B31B 1/60; B29D 11/00

[52] U.S. Cl. ............................ 350/96.20; 350/96.34; 350/320; 156/322; 156/327; 156/60; 264/1.1; 264/1.5

[58] Field of Search ............... 350/96.20, 96.21, 96.22, 350/96.34, 320; 264/1.1, 1.5; 156/158, 160, 166, 182, 322, 327, 60

[56] References Cited

U.S. PATENT DOCUMENTS

| | | | |
|---|---|---|---|
| 4,264,128 | 4/1981 | Young | 350/96.20 |
| 4,440,469 | 4/1984 | Schumacher | 350/96.20 |
| 4,476,194 | 10/1984 | Sanborn et al. | 428/585 |
| 4,588,256 | 5/1986 | Onstott et al. | 350/96.21 |
| 4,666,241 | 5/1987 | Caron | 350/96.21 |
| 4,713,523 | 12/1987 | MacDonald | 219/385 |
| 4,729,619 | 3/1988 | Blomgren | 350/96.21 |
| 4,784,457 | 11/1988 | Finzel | 350/96.21 |
| 4,812,006 | 3/1989 | Osborn et al. | 350/96.21 |
| 4,812,008 | 3/1989 | Tokumaru et al. | 350/96.21 |
| 4,907,852 | 3/1990 | Noba et al. | 350/96.20 |

*Primary Examiner*—Brian Healy
*Attorney, Agent, or Firm*—Donald M. Sell; Walter N. Kirn; Stephen W. Buckingham

[57] ABSTRACT

An optical fiber connector can be easily and quickly assembled by mounting the end of an optical fiber in a thermoplastic adhesive that is heated to a viscosity of between 1000 and 10,000 cp, has an Adhesion-to-Glass Value of at least 10N, and a Shore D hardness of at least 60 at 20° C. The optical fiber connector lends itself to mass-production techniques and can be reused by heating to liquify the thermoplastic adhesive.

19 Claims, 1 Drawing Sheet

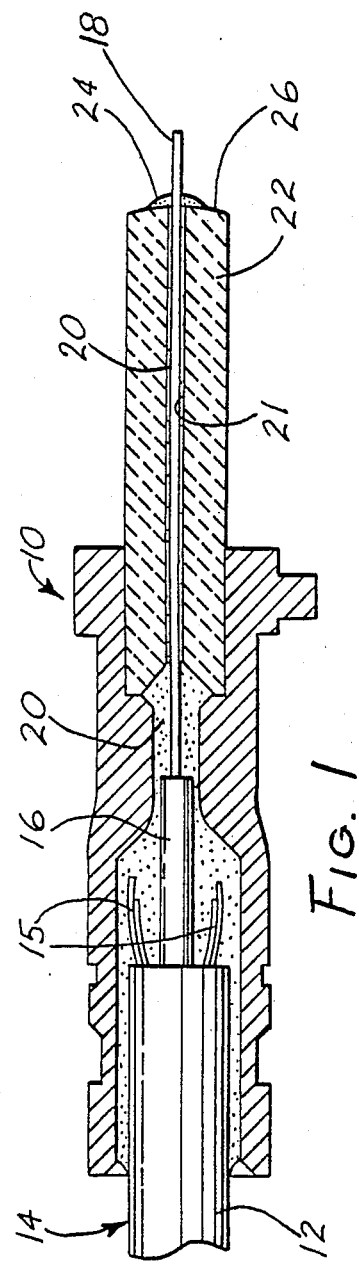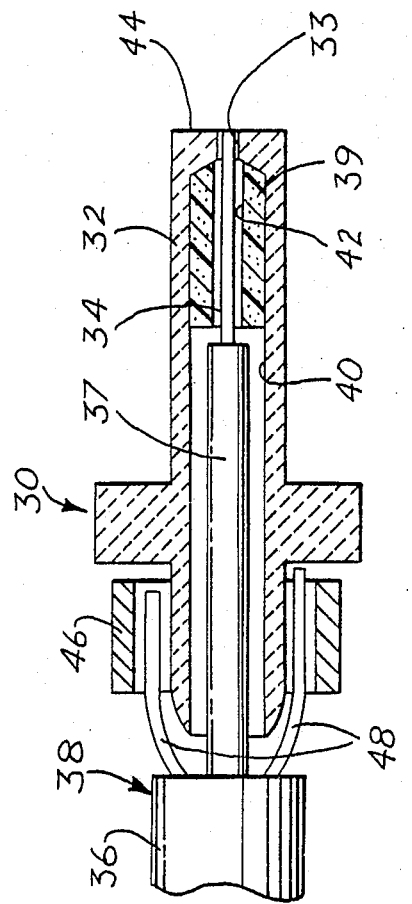

THERMOPLASTIC ADHESIVE MOUNTING APPARATUS AND METHOD FOR AN OPTICAL FIBER CONNECTOR

BACKGROUND OF THE INVENTION

1. Field of the Invention

The invention is concerned with a connector for an optical fiber cable wherein a bare end of an optical fiber is mounted with an adhesive, which connector permits the mounted optical fiber to be connected optically, e.g., to another optical fiber or to an optoelectronic device.

2. Description of the Related Art

In most optical fiber connectors, an epoxy resin adhesive is employed to mount the end of the optical fiber. Detailed instructions for doing so are given in "Field Termination Instruction Manual for Dorran TM . . . Field Mountable Connectors," December 1988, 3M Fiber Optic Products. To do so, the epoxy resin adhesive is mixed and loaded into a syringe by which it is injected into the connector. After coating the outer jacket of the optical fiber cable with a thin layer of the epoxy composition, the epoxy-containing connector is threaded onto the fiber, the connector is crimped onto the outer jacket, and a load adapter and strain relief boot are applied. The resulting assembly is inserted into a port of an oven to cure the epoxy resin adhesive, followed by scoring and breaking off the fiber and polishing until the end of the fiber and the cured epoxy resin are flush with the end face of the connector.

A number of patents concern other types of optical fiber connectors wherein a base optical fiber is mounted by a curable adhesive such as an epoxy resin composition. For example, see U.S. Pat. No. 4,476,194 (Rasmussen) which employs an epoxy adhesive or a light-curing adhesive. See also U.S. Pat. No. 4,713,523 (MacDonald) which concerns apparatus that is said to improve the control of the heating of the epoxy composition during cure.

U.S. Pat. No. 4,588,256 (Onstott et al.) concerns an optical fiber connector that preferably employs a hot-melt adhesive instead of a curable adhesive. Referring to FIG. 1, the hot-melt adhesive is injection loaded into a tubular member 24 of an optical fiber mounting means 16 which is placed in a heatable jig to liquify the hot-melt adhesive and allow insertion of an optical fiber. The hot-melt adhesive is not identified, and the Onstott connector has not been marketed.

U.S. Pat. No. 4,812,006 (Osborn et al.) says that the use of an epoxy adhesive to retain an optical fiber cable in a connector is messy and requires time for the adhesive to cure. Osborn also says that another approach which has been suggested is to use a soft plastic body surrounding the cable and a metal tube covering the plastic body. Osborn avoids the use of any adhesive by employing a mechanical connector wherein the end of an optical fiber fits snugly in a bore. Unfortunately, any connector that employs only mechanical means to mount an optical fiber would not be suitable for uses requiring precise positioning of the end of the fiber.

The term "optical fiber connector" has also been used to describe devices for forming butt joints or splices of optical fibers. See, for example, U.S. Pat. Nos. 4,729,619 (Blomgren); 4,812,008 (Tokumaru et al.); and 4,784,457 (Finzel). The Blomgren patent points out that in such devices, index matching materials enable the splicing of optical fibers which have irregular ends or which are not butted together precisely. However, the term "optical fiber connector," as used in the present application, does not encompass such devices, but only a device that can be mechanically fastened to another device to effect an optical connection between the two devices.

SUMMARY OF THE INVENTION

The present invention should make it easier and faster to assemble an optical fiber connector and with less chance of failure, doing so by mounting the end of the optical fiber in a thermoplastic adhesive that can position the end of the fiber as precisely and as reliably as can epoxy resin compositions. Briefly, the thermoplastic adhesive of the invention comprises a thermoplastic resin and is characterized by (a) a viscosity of between 1000 and 10,000 cp at a suitable working temperature not harmful to the connector (up to about 260° C.), (b) an Adhesion-to-Glass Value (as defined below) of at least 10N, and (c) a Shore D hardness of at least 60° at 20° C. A thermoplastic adhesive of such properties has a number of important attributes:

(1) It lends itself to mass-production techniques by being placed in body of the optical fiber connector during manufacture where it remains viable until the connector is assembled, even after prolonged periods of time whereas uncured epoxy resin compositions typically are loaded into the connector at the same time as it receives the optical fiber and have limited shelf life;

(2) it has sufficient hardness to be polished with the end of the optical fiber without smearing;

(3) because the thermoplastic adhesive cools quickly, the polishing can be done immediately, contrasted to the time delay to permit an epoxy resin to cure before it can be polished;

(4) if the optical fiber should break or otherwise become damaged, the connector can be reused by heating to liquify the thermoplastic adhesive, whereas a connector with cured epoxy cannot; and (5) in contrast to epoxy resin compositions, no mixing is required.

A thermoplastic adhesive of the invention can be injected into an optical fiber connector or inserted as a slug. Then while being heated to reduce its viscosity to within the range of 1000 to 10,000 cp, the bare end of an optical fiber can be inserted into the connector through the molten adhesive.

For use in the invention, a preferred class of thermoplastic resins is polyamides. They can be formulated to provide thermoplastic adhesives that have good hardness, low viscosity at suitable working temperatures, excellent adhesion to glass, and thermal expansion coefficients (TECs) that are lower than can be achieved with many other thermoplastic resins. Even so, thermoplastic adhesives of the invention inevitably have a TEC that is higher than the TEC of glass and other components of the optical connector. In order to reduce the transmission of heat-induced stresses to the optical fiber, the TEC of the thermoplastic adhesive can be significantly reduced by filling it with glass microspheres to a volume ratio up to 70 parts of microspheres to 30 parts thermoplastic adhesive. Preferably, that volume ratio is not more than 50:50 so that its viscosity is not more than 10,000 cp at a desirably low temperature such as from 80°–260° C., more preferably not exceeding 210° C. Keeping the application temperature below 210° C. both saves energy and minimizes any danger of damage to the connectors or injury to persons who assemble the connectors.

When the thermoplastic adhesive includes microspheres, they preferably are at least 5 μm in diameter so that when an optical fiber is inserted into an optical connector, it pushes any microspheres out of the alignment bore, because the diameter of the alignment bore is typically no more than 2 μm greater than that of the optical fiber. On the other hand, the microspheres preferably are no greater than 50 μm in diameter, because microspheres of substantially larger diameter might block the alignment bore and thus prevent an optical fiber from being inserted, unless the thermoplastic adhesive is in the form of a bored slug that is not heated until the end of the optical fiber has been inserted.

DESCRIPTION OF THE DRAWING

The invention may be more easily understood in reference to the drawing, of which FIG. 1 is a longitudinal cross section through a preferred optical fiber connector of the invention; and FIG. 2 is a longitudinal cross section through another optical fiber connector of the invention.

DETAILED DESCRIPTION

Before assembling the optical fiber connector 10 of FIG. 1, the jacket 12 is removed at one end of an optical fiber cable 14 to expose "Kevlar" polyaramid fibers 15, and the buffer 16 is stripped to bare the optical fiber 18. A thermoplastic adhesive 20 is injected into the hollow interior of the connector and also fills a bore 21 in a ceramic ferrule 22. Then the optical fiber is pushed through the molten adhesive until it protrudes from the ferrule. In doing so, the optical fiber carries with it some of the thermoplastic adhesive, and a bead 24 of the solidified adhesive provides lateral support to the protruding portion of the fiber. Because of this support, the optical fiber can be cleaved at the tip of the bead and then polished until it is flush with the face 26 of the ferrule.

The thermoplastic adhesive 20 preferably contains a dye that affords a deep color to the bead. As long as that color remains deep, the fiber end can be polished with a relatively coarse abrasive, but one should switch to a finer abrasive when a weaker color indicates that the end of the optical fiber is nearly flush with the ferrule. The polishing should be discontinued as soon as the color disappears. Otherwise difficulties would arise due to the greater hardness of the ferrule. Furthermore, the ferrule has been shaped to the proper curvature, and continued polishing could alter that curvature.

In the completed connector of FIG. 1, the thermoplastic adhesive bonds to the "Kevlar" fibers 15 to restrain the optical fiber cable 14 against accidental pullout and also bonds to the bare optical fiber 18 along the full length of the bore 21 to restrain the fiber against pistoning due to stresses arising from temperature changes.

In the optical fiber connector 30 of FIG. 2, the connector body 32 is formed with a fiber-alignment hole 33 into which a bare optical fiber 34 snugly fits. Before assembling the connector, the jacket 36 and buffer 37 of an optical fiber cable 38 are partially stripped in the same manner as was the cable 14 in FIG. 1. After placing a slug 39 of thermoplastic adhesive in a hollow 40 of the connector body 32, the bare optical fiber 34 is cleaved and fed through a longitudinal opening 42 in the slug until the cleaved end is flush with the face 44 of the connector body. Heat is applied to liquify the slug of thermoplastic adhesive, causing it to become bonded both to the bare optical fiber and to the cylindrical wall of the hollow 40. Doing so guards against pistoning of the fiber, while a mechanical clamping ring 46 grips the "Kevlar" fibers 48 to restrain the optical fiber cable 38 against accidental pull-out. Then a strain-relief boot (not shown) is applied over the ring 46.

Another optical fiber connector in which the thermoplastic adhesive of the invention can be used is that of the above-cited Onstott patent.

Adhesion-to-Glass Value

From one end of a piece of a 125-μm multimode optical fiber cable (Siecor 1K31-31111-00) 0.6 m in length, 10 cm of the jacket and 5 cm of the buffer are removed to leave 5 cm of the bare fiber that is then cleaned with acetone. A cylindrical bore (6.4 mm in depth and 3.2mm in diameter) of a steel fixture is filled with molten thermoplastic adhesive to be tested, and the bare fiber is inserted to its full length while the viscosity of the thermoplastic adhesive is from 1000 to 10,000 cp. After the resin has cooled to room temperature, the fixture is clamped into the lower jaw of an Instron Tensile Tester, and the jacketed end of the optical fiber is wound around a rod and clamped on either side of the rod by the upper jaw, thus ensuring against slippage in the upper jaw. The Adhesion-to-Glass Value of the thermoplastic adhesive is the resistance to pullout at a jaw separation rate of 6.4 mm/min.

An Adhesion-to-Glass Value of at least 10N is considered to be adequate to use a thermoplastic adhesive for mounting optical fibers in connectors. To minimize temperature-induced optical transmission losses, the Adhesion-to-Glass value preferably is at least 15N, more preferably about 20N or higher.

For comparative purposes, an epoxy resin can be substituted for the thermoplastic adhesive and then cured as recommended by the manufacturer.

Polyamides A and B

Thermoplastic resins that have been formulated into thermoplastic adhesives of the invention include three polyamide resins, one of which ("Versamid" V-900 from Henkel) is commercially available, while the other two were random condensation polymers of the following compositions in equivalent percents:

| Polyamide | A | B |
|---|---|---|
| dimer acid | 68.0 | 67.0 |
| monomer acid | 0.3 | 1.3 |
| azelaic acid | 31.7 | 31.7 |
| ethylene diamine | 81.0 | 81.0 |
| hexamethylene diamine | 19.0 | 19.0 |
| antioxidant (wgt. %) | 0.75 | 0.75 |

Also used in the examples were the following commercially available materials:

"Piccofyn" T-125, a high-softening-point terpene hydrocarbon tackifying resin having a ring-and-ball softening point of 125° C. (from Hercules)

"Dymerex", a high-softening-point tackifying resin composed predominantly of dimeric acids derived from rosin (from Hercules)

"Hercoflex" 500, a resinous plasticizer derived from rosin (from Hercules)

"Santicizer" 711, a dialkyl phthalate plasticizer (from Monsanto)

In the following examples, all parts are by weight.

EXAMPLES 1-5

A series of thermoplastic adhesives, the formulations of which are given in Table I, were tested with the results also reported in Table I.

TABLE I

| Example | 1 | 2 | 3 | 4 | 5 |
|---|---|---|---|---|---|
| Polyamide A | 50 | 55 | 50 | 50 | |
| Polyamide B | | | | | 55 |
| "Versamid" 900 | 25 | 25 | 25 | 30 | 25 |
| "Piccofyn" T-125 | 20 | 20 | | | 20 |
| "Dymerex" | | | 20 | 20 | |
| "Hercoflex" 500 | | | 5 | | |
| "Santicizer" 711 | 5 | | | | |
| Visc. (cp at 204° C.) | | 1400 | | | 1240 |
| TEC (cm/cm/°C. × 10$^{-6}$) | | 255 | | | 159 |
| Hardness (Shore D) | | 65 | | | 65 |
| Adhesion-to-Glass Value (Newtons) | 15.0 | 19.3 | 12.5 | 14.3 | 24.5 |
| Temp. Cycling Test (dB) | | 0.16 | | | 0.12 |

For comparison, two commercially available thermoplastic adhesives were furnished by suppliers who had been asked for a hard, high-temperature thermoplastic adhesive having good adhesion to glass. The two were "Macromelt" 6212 thermoplastic adhesive from Henkel, and "JetMelt" 3779 thermoplastic adhesive from 3M, and both were based on polyamide thermoplastic resins. These two thermoplastic adhesives exhibited Adhesion-to-Glass Values of 3.6 and 1.8N, respectively.

EXAMPLE 6

An optical fiber connector as illustrated in FIG. 1 of the drawing was constructed as follows:

(a) While heating the connector to 204° C., the thermoplastic adhesive of Example 5 containing 0.1% of "Oil Blue A" dye was injected into the connector at 80 psi (0.55 MPa), and the pressure was maintained for about 6 seconds until some of the adhesive emerged through the bore of the ferrule. ("Oil Blue-A" dye is 1,4-di(isopropylamino)anthraquinone from E. I. DuPont).

(b) From an optical fiber cable (125 μm multimode from Siecor) 4 m in length, about 3 cm of jacket was removed, and the "Kevlar" fibers were trimmed to about 3 mm.

(c) All but 4 mm of buffer was removed and the exposed optical fiber was cleaned with alcohol.

(d) After reheating the connector to 204° C., the bare fiber was inserted through the molten adhesive until the cable bottomed in the connector and the fiber protruded beyond the face of the connector, while making sure that the "Kevlar" fibers were not folded back.

(e) Adhesive which had extruded through the rear of the connector was trimmed off, and the connector was allowed to cool.

(f) The steps outlined in Sections D-F of the above-cited "Field Termination Instruction Manual . . . " were followed, namely, the fiber was scored, cleaved, polished with 5 μm acetate until the blue color of the bead became faint and then with 1 μm acetate until the end of the fiber was flush with the face of the ferrule.

Microscopic examination of the tip of the fiber showed it to be free from adhesive and scratches.

An identical optical fiber connector was assembled in the same way at the opposite end of the cable to provide "jumper A" which with an identical "jumper B" were subjected to the following "Temperature Cycling Test":

(a) Connect the first end of jumper A to an 850 nm optical source.

(b) Connect the second end of jumper A to the first end of jumper B.

(c) Connect the second end of jumper B to an optical detector.

(d) While monitoring the optical power transmitted through the jumper assembly, subject the A-B portion of the assembly to temperature cycling after an initial stabilization period of 4 hours at 20° C., then alternately to 60°, 20°, −40°, 20°, 60°, etc. for a total of 50 hours from the beginning of the stabilization period, with all temperature transitions at 1° C./min. and all dwells for one hour.

The temperature-induced optical transmission loss during step (d) was 0.12 dB which was considered to be satisfactorily low for use with multimode fibers.

EXAMPLE 7

An optical fiber connector was made as in Example 6 except using the thermoplastic adhesive of Example 2 without any dye. The absence of dye required the end of the connector to be periodically examined under magnification to observe the extent of the dull spot produced by the coarse abrasive as the end of the fiber and the bead of adhesive were worn away. When that dull spot nearly covered the ferrule face, the polishing was completed with the finer 1 μm acetate abrasive.

Upon completing two jumpers having four connectors of this example, the temperature induced loss was 0.16 dB in the "Temperature Cycling Test" of Example 6.

EXAMPLE 8

A biconical optical fiber connector was constructed like that illustrated in the "Field Termination Instruction Manual for Biconic Plugs" of Dorran Photonics, Inc., Atlantic Highlands, N.J.

(a) While heating the connector to 204° C., the thermoplastic adhesive of Example 2 containing glass microspheres of 11.7 μm median diameter in a 50:50 ratio, by volume, was injected into the connector at 80 psi (0.55 MPa), and the pressure was maintained for about 6 seconds until some of the adhesive emerged through the bore of the ferrule. The connector was then allowed to cool to room temperature (b) From an optical fiber cable (125 μm singlemode Siecor 1S31-31111-00) about 5 cm of jacket was removed, and the "Kevlar" fibers were trimmed to about 3 mm.

(c) All but 8 mm of buffer was removed and the exposed optical fiber was cleaned with alcohol.

(d) After reheating the connector to 204° C., the bare fiber was inserted through the molten adhesive until the cable bottomed in the connector and the fiber protruded beyond the face of the connector while making sure that the "Kevlar" fibers were not folded back.

(e) Adhesive which had extruded through the rear of the connector was trimmed off, and the connector was allowed to cool.

(f) The steps outlined in sections C-E of the above-cited "Field Termination Instruction Manual for Biconic Plugs" were followed, namely, the fiber was scored, cleaved, polished in sequence with 8 μm, 1 μm, and 0.3 μm acetate, checked for length and optical finish, and assembled.

The procedure above was followed four times in constructing two test jumpers of 125 μm in the same manner as in Example 6. In the Temperature Cycling Test, the temperature-induced optical transmission loss was 0.6 dB. This compares with a temperature-induced optical transmission loss of more than 2 dB for test jumpers constructed using the adhesive of Example 2 without glass microspheres in an otherwise identical test.

What is claimed is:

1. An optical fiber connector containing a thermoplastic adhesive by which an optical fiber can be mounted, which thermoplastic adhesive comprises a thermoplastic resin and is characterized by
    (a) a viscosity of between 1000 and 10,000 cp at a suitable working temperature not harmful to the connector,
    (b) an Adhesion-to-Glass Value of at least 10N, and
    (c) a Shore D hardness of at least 60° at 20° C.

2. An optical fiber connector as defined in claim 1 wherein said thermoplastic adhesive contains a dye.

3. An optical fiber connector as defined in claim 1 wherein said thermoplastic resin is a polyamide 4. An optical fiber connector as defined in claim 1 wherein said polyamide comprises a reaction product of dimer acid, azelaic acid and diamine.

5. An optical fiber connector as defined in claim 3 wherein said thermoplastic adhesive comprises a blend of a tackifying resin and a plasticizer.

6. An optical fiber connector as defined in claim 1 and into which said thermoplastic adhesive has been injected.

7. An optical fiber connector as defined in claim 1 and into which a slug of said thermoplastic adhesive has been inserted.

8. An optical fiber connector as defined in claim 7 wherein said slug of said thermoplastic adhesive is formed with a central through-hole through which an optical fiber can be fed without heating the adhesive.

9. An optical fiber connector as defined in claim 1 and in which an optical fiber has been mounted by heating the adhesive above its softening point.

10. An optical fiber connector as defined in claim 1 wherein said thermoplastic adhesive is filled with glass microspheres that are from 5 to 50 μm in diameter.

11. An optical fiber connector as defined in claim 10 wherein the volume ratio of the microspheres to thermoplastic adhesive is not more than 70:30.

12. An optical fiber connector as defined in claim 11 wherein volume ratio of the microspheres to thermoplastic adhesive is not more than 50:50.

13. Method of mounting an optical fiber in a connector, said method comprising the steps of
    (1) inserting into the connector a thermoplastic adhesive that is characterized by
        (a) a viscosity of between 1000 and 10,000 cp at a working temperature not harmful to the connector,
        (b) an Adhesion-to-Glass Value of at least 10N, and
        (c) a Shore D hardness of at least 60 at 20° C.
    (2) inserting an optical fiber into the connector;
    (3) heating to soften the adhesive to flow into contact with the optical fiber; and
    (4) cooling to harden the adhesive around the optical fiber to provide a mount for the fiber.

14. Method as defined in claim 13 wherein step (3) precedes step (2) and when the optical fiber is inserted into the connector, it protrudes beyond the face of the connector and carries with it some of the thermoplastic adhesive, and a bead of the solidified adhesive provides lateral support to the protruding portion of the fiber.

15. Method as defined in claim 14 wherein the optical fiber is cleaved at the tip of the bead of solidified adhesive and then polished until it is flush with the tip of the connector.

16. Method as defined in claim 15 wherein the thermoplastic adhesive contains a dye that affords a deep color to said bead and, while said bead retains that deep color, the polishing step is with a relatively coarse abrasive, and when that color becomes weak, a finer abrasive is used.

17. Method as defined in claim 13 wherein the adhesive is heated prior to step (2) to reduce its viscosity to within the range of from 1000 to 10,000 cp.

18. Method as defined in claim 13 wherein prior to step (1) the adhesive is shaped into a slug which in step (1) is inserted as such into the connector.

19. Method as defined in claim 13 wherein prior to step (1) a central through-hole is formed in the slug, and in step (2), the optical fiber is inserted through said through-hole prior to step (3).

* * * * *